(12) United States Patent
Vajravel et al.

(10) Patent No.: US 11,455,196 B2
(45) Date of Patent: Sep. 27, 2022

(54) ADAPTIVE PRIORITIZATION OF USB TRAFFIC

(71) Applicant: Dell Products L.P., Round Rock, TX (US)

(72) Inventors: Gokul Thiruchengode Vajravel, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/008,914

(22) Filed: Sep. 1, 2020

(65) Prior Publication Data

US 2022/0066836 A1 Mar. 3, 2022

(51) Int. Cl.
*G06F 9/50* (2006.01)
*G06F 13/42* (2006.01)

(52) U.S. Cl.
CPC ........ *G06F 9/5061* (2013.01); *G06F 13/4282* (2013.01); *G06F 2213/0042* (2013.01)

(58) Field of Classification Search
CPC .............. G06F 9/5061; G06F 13/4282; G06F 2213/0042
See application file for complete search history.

(56) References Cited

U.S. PATENT DOCUMENTS

| | | | | |
|---|---|---|---|---|
| 9,183,164 B2* | 11/2015 | Brabenac | ............ | G06F 13/4022 |
| 2010/0095021 A1* | 4/2010 | Samuels | ................. | H04L 47/70 709/235 |
| 2011/0022769 A1* | 1/2011 | Hung | .................... | G06F 13/102 710/313 |
| 2011/0208892 A1* | 8/2011 | Meyers | ............... | G06F 13/4226 710/313 |
| 2015/0046624 A1* | 2/2015 | Ramirez | ............... | G06F 13/409 710/303 |
| 2016/0112711 A1* | 4/2016 | Hundal | ............... | G06F 13/4282 375/240.26 |
| 2017/0017595 A1* | 1/2017 | Schnell | ............... | G06F 13/4022 |
| 2017/0024344 A1* | 1/2017 | Shetty | ................. | G06F 13/4282 |
| 2018/0351744 A1* | 12/2018 | Ogle | ..................... | H04W 12/126 |
| 2019/0138469 A1* | 5/2019 | Lee | .......................... | G06F 13/20 |
| 2019/0324511 A1* | 10/2019 | Cao | ........................... | G06F 1/28 |

* cited by examiner

*Primary Examiner* — Henry Tsai
*Assistant Examiner* — Harry Z Wang
(74) *Attorney, Agent, or Firm* — Kirton McConkie; Brian Tucker

(57) ABSTRACT

Traffic for USB devices that are connected to a USB-C dock can be adaptively prioritized. When the consumption of the bandwidth of a connection between a computing device and a USB-C dock exceeds a threshold, a filter driver can notify a service. The service can update device priority values for the devices that are connected to the USB-C dock based on applications that are accessing the devices. The service can relay the updated device priority values to the filter driver. The filter driver can then attempt to reduce bandwidth consumption by changing device settings of any device with a lower priority value, and then, if changing device settings is insufficient, may attempt to reduce bandwidth consumption by lowering the priority of the device's traffic.

14 Claims, 14 Drawing Sheets

ADAPTIVE PRIORITIZATION OF USB TRAFFIC

CROSS-REFERENCE TO RELATED APPLICATIONS

N/A

BACKGROUND

The USB-C connector includes additional lanes for supporting alternate modes (or "Alt modes") to thereby allow non-USB traffic to be transferred over a USB connection. Alt modes have commonly been used to transfer video traffic over a USB-C cable (e.g., DisplayPort Alt mode or HDMI Alt mode). With these earlier Alt modes, the extensible host controller interface (XHCI) controller did not manage the non-USB traffic. In contrast, with the introduction of Thunderbolt 3 Alt mode, any non-USB traffic supported by the Thunderbolt 3 interface is managed by the XHCI controller. The current USB4 standard also adopts this approach.

Both USB-C Thunderbolt 3 Alt mode and USB4 support two types of traffic: (1) isochronous traffic (e.g., DisplayPort, HDMI and DisplayLink video and HD audio); and (2) non-isochronous traffic (e.g., 10/40G NIC, SSD, PCIe and classic USB traffic). Typically, the isochronous traffic has a reserved bandwidth (e.g., 40%) and all other non-isochronous traffic shares the unreserved bandwidth. As an example, if a 4K monitor, Thunderbolt SSD storage and an eGPU are all connected to a single 10 Gbps USB-C hub, the 4K monitor will reserve 4 Gbps and the storage and eGPU will share the remaining 6 Gbps.

In many use cases, this sharing of bandwidth can lead to a poor user experience. For example, FIG. 1 represents a scenario where a computing device 200 is connected to a USB-C dock 100 to which multiple other USB devices are also connected. These other devices include a USB keyboard 110, a USB mouse 120, a USB or USB-C external network adapter 130, a USB or USB-C external storage drive 140, a DisplayPort (USB-C) monitor 150, a DisplayPort (USB-C) monitor 160 and a USB-C webcam 170.

If USB-C dock 100 complies with the USB 3.2 standard, the USB-C connection 101 between computing device 200 and USB-C dock 100 will have a maximum bandwidth of 20 Gbps. In such cases, if monitors 150 and 160 are 4K 30 Hz 24-bit monitors, their combined bandwidth could be up to 13 Gbps, leaving only 7 Gbps for the remaining devices. With this setup, there may be many scenarios where the bandwidth available over connection 101 will be insufficient. For example, during a video conference, webcam 170 would likely consume significant bandwidth as it sends captured video data to computing device 200 over connection 101. Computing device 200 may in turn consume additional bandwidth as it sends the video data to and receives other video data from external network adapter 130. A data backup to external storage drive 140 would also consume the bandwidth of connection 101. Accordingly, if a backup were performed during a video conference, the 20 Gbps bandwidth of connection 101 (or more specifically, whatever bandwidth is not consumed by or reserved for monitors 150 and 160) will likely be insufficient and lead to degradation of the video conference.

A similar degradation in performance could also occur in a creativity/engineering setup. For example, if webcam 170 in FIG. 1 were replaced with an eGPU that is used to render complex designs, the amount of bandwidth that monitors 150 and 160 do not consume may be insufficient for the eGPU and the other peripherals. A gaming setup may suffer from the same limitations. These are just examples of the many scenarios where the available bandwidth of a USB-C connection may be insufficient. Generally speaking, due to the consistently increasing resolution of the latest monitors, the USB-C connection between a computing device and its peripherals will oftentimes form a bottleneck for any non-isochronous traffic.

The USB4 standard provides techniques for prioritizing some traffic. In particular, USB4 allows priority queues to be implemented to prioritize traffic according to its "priority group." However, even with the use of priority queues, there is still no way to differentiate between the various types of non-isochronous traffic. More particularly, the USB4 standard does not provide a way to prioritize a particular type of non-isochronous traffic to enhance the user experience for a particular workload.

BRIEF SUMMARY

The present invention extends to methods, systems, and computer program products for adaptively prioritizing traffic for USB devices that are connected to a USB-C dock. When the consumption of the bandwidth of a connection between a computing device and a USB-C dock exceeds a threshold, a filter driver can notify a service. The service can update device priority values for the devices that are connected to the USB-C dock based on applications that are accessing the devices. The service can relay the updated device priority values to the filter driver. The filter driver can then attempt to reduce bandwidth consumption by changing device settings of any device with a lower priority value, and then, if changing device settings is insufficient, may attempt to reduce bandwidth consumption by lowering the priority of the device's traffic.

In some embodiments, the present invention may be implemented as a method for adaptively prioritizing traffic of USB devices that are connected to a USB dock. It can be detected that bandwidth consumption of a connection between a computing device and a USB dock has exceeded a threshold. In response to the detection, a different alternate mode can be selected for at least one USB device of a plurality of USB devices that are connected to the USB dock.

In some embodiments, the present invention may be implemented as computer storage media storing computer executable instructions which when executed on a computing device implement a filter driver and a service. The filter driver may be configured to register with a USB controller driver to be notified when bandwidth consumption of a connection between the computing device and the USB dock has reached one or more thresholds. The filter driver may also be configured to notify the service upon receiving a notification that the bandwidth consumption of the connection between the computing device and the USB dock has reached the one or more thresholds. The service may be configured to monitor applications that are accessing USB devices that are connected to the USB dock, set a device priority for each of the USB devices based on the applications and provide the device priority for each of the USB devices to the filter driver. The filter driver may be further configured to adaptively prioritize traffic of at least one of the USB devices based on the device priority for each of the USB devices.

In some embodiments, the present invention may be implemented as a computing device that includes one or more processors and computer storage media storing computer executable instructions which when executed implement a method for adaptively prioritizing traffic of USB devices that are connected to a USB-C dock. A filter driver may detect that bandwidth consumption of a connection between the computing device and the USB-C dock has exceeded a threshold. The filter driver may then send a notification to a service that the bandwidth consumption of the connection between the computing device and the USB-C dock has exceeded the threshold. In response to the notification and in conjunction with monitoring applications that are accessing USB devices that are connected to the USB-C dock, the service may identify a device priority for each of the USB devices. In response to receiving the device priority for each of the USB devices from the service the filter driver may change an alternate mode of at least one of the USB devices.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
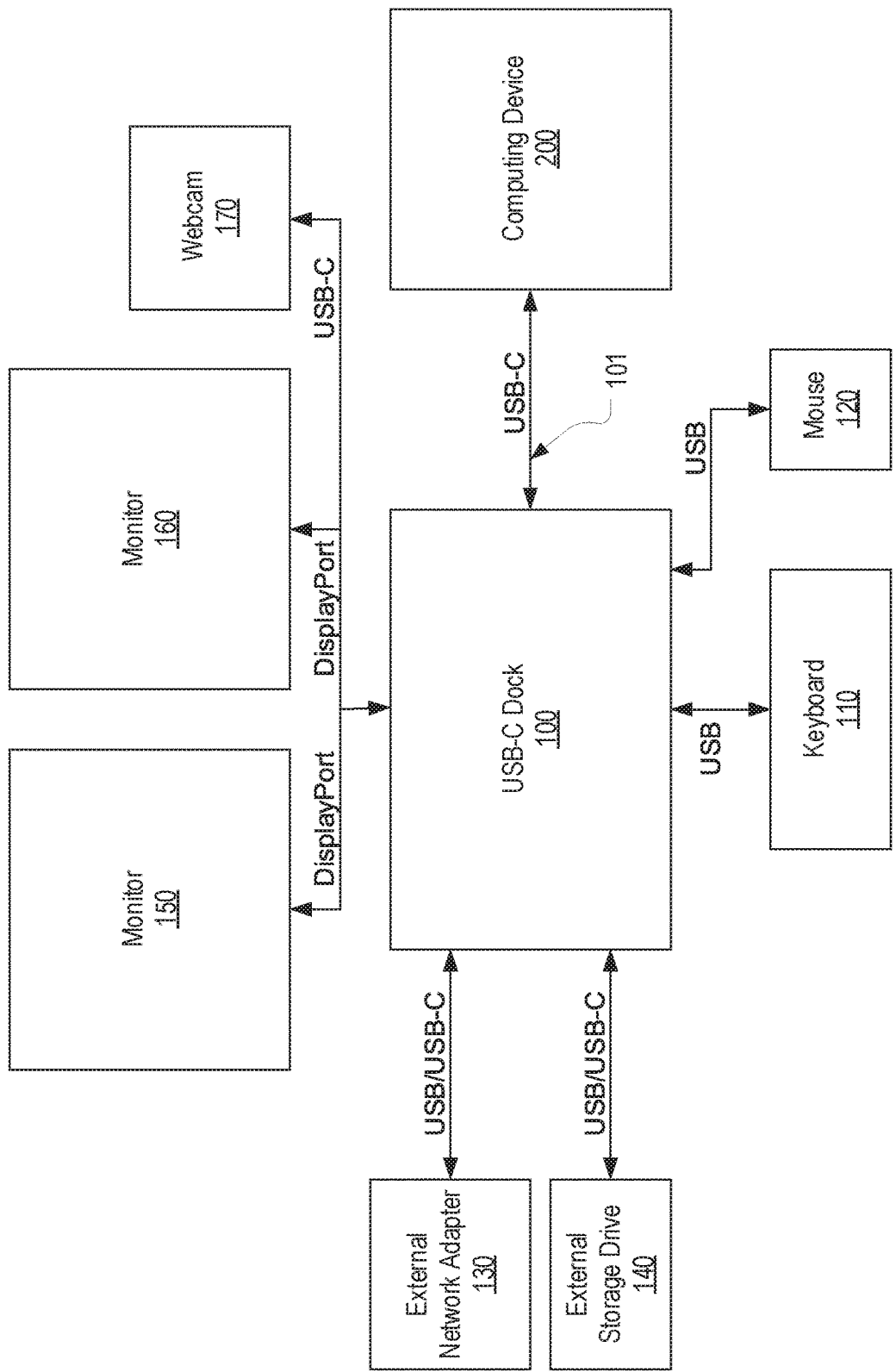
FIG. 1 provides an example of how multiple USB devices may be connected to a computing device via a USB-C dock.
Figure 2:
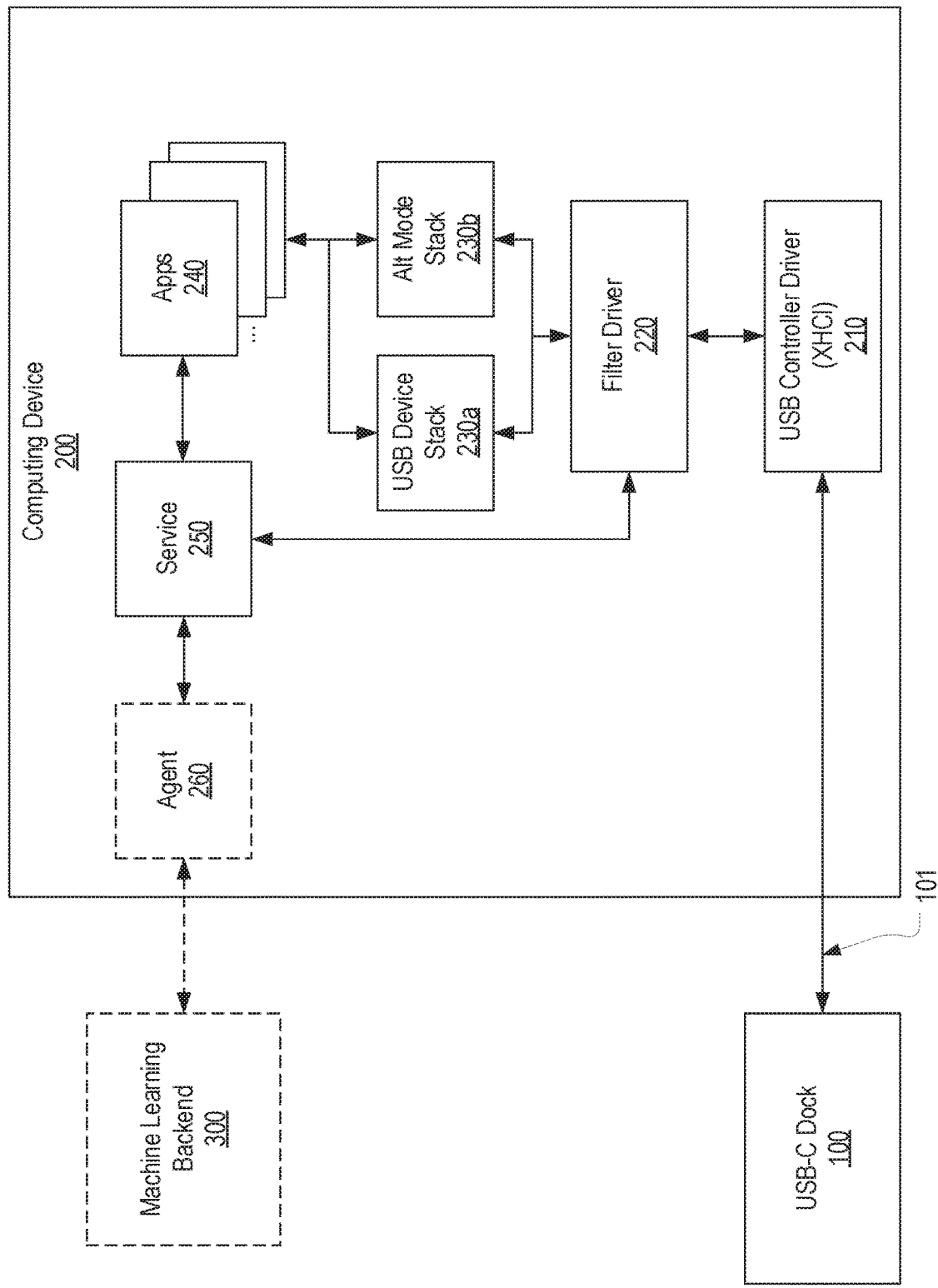
FIG. 2 provides an example of components that may exist on a computing device that is configured to adaptively prioritize traffic of USB devices that are connected to a USB-C dock in accordance with embodiments of the present invention.

FIG. 2 provides a block diagram of various components that may exist on computing device 200 when it is configured to implement embodiments of the present invention to adaptively prioritize traffic of USB devices that are connected to USB-C dock 100. As shown, computing device 200 can include a USB controller driver 210 which is the software counterpart to the physical USB extensible host controller (not shown). USB controller driver 210 may typically represent any driver that is configured to implement the extensible host controller interface and is commonly provided by Intel. Of primary relevance to embodiments of the present invention, USB controller driver 210 manages connection 101 between computing device 200 and USB-C dock 100. Although not shown, it can be assumed that multiple devices are connected to USB-C dock 100 including, for example, the setup shown in FIG. 1.

Computing device 200 is also shown as including USB device stack(s) 230a and Alt mode stack(s) 230b that sit above USB controller driver 210. Of relevance to embodiments of the present invention, applications 240 employ USB device stack(s) 230a and/or Alt mode stack(s) 230b to communicate with USB devices connected to USB-C dock 100 (and possibly with USB devices connected directly to computing device 200) via USB controller driver 210.

In accordance with embodiments of the present invention, computing device 200 may also include a filter driver 220 that sits above USB controller driver 210 (e.g., a USB controller device upper filter driver) and a service 250 (e.g., a user-mode service that runs in the background). In some embodiments, computing device 200 may also include an agent 260 that is configured to interface with a machine learning backend 300 (e.g., a server). As an overview, filter driver 220 and service 250 can intercommunicate as part of an adaptive process to prioritize the traffic to and from USB devices connected to USB-C dock 100. As described below, this process can be performed whether or not USB controller driver 210 implements prioritization techniques.

FIGS. 3A-3F represent how filter driver 220 and service 250 may adaptively prioritize USB traffic in some embodiments of the present invention. In step 1 shown in FIG. 3A, filter driver 220 may identify the USB controller to determine whether it supports traffic prioritization. For example, during its initialization, filter driver 220 could send a request to USB controller driver 210 for the device identifiers of the USB controller and could use the device identifiers to determine whether the USB controller complies with the USB4 standard. If filter driver 220 determines that the USB controller supports traffic prioritization (e.g., that USB controller driver 210 implements priority queues in accordance with the USB4 standard), filter driver 220 may leverage this traffic prioritization. In contrast, if the USB controller does not support traffic prioritization (e.g., if USB controller driver 210 complies with an earlier version of the USB standard), filter driver 220 may implement traffic prioritization techniques (e.g., by implementing priority queues).

Figure 3A:
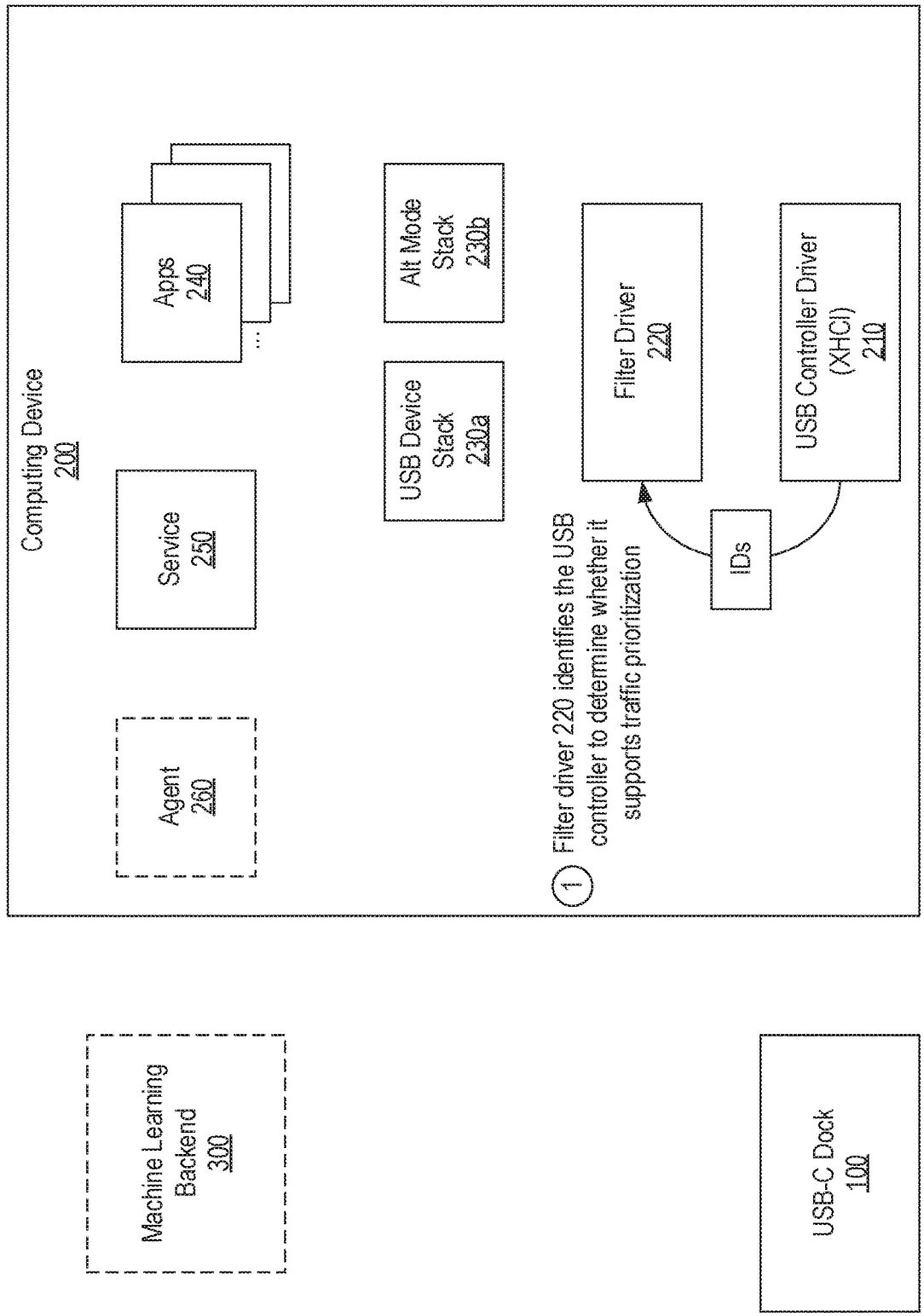
FIGS. 3A-3F provide an example of how a filter driver may notify a service when a bandwidth consumption event occurs.
Figure 3B:
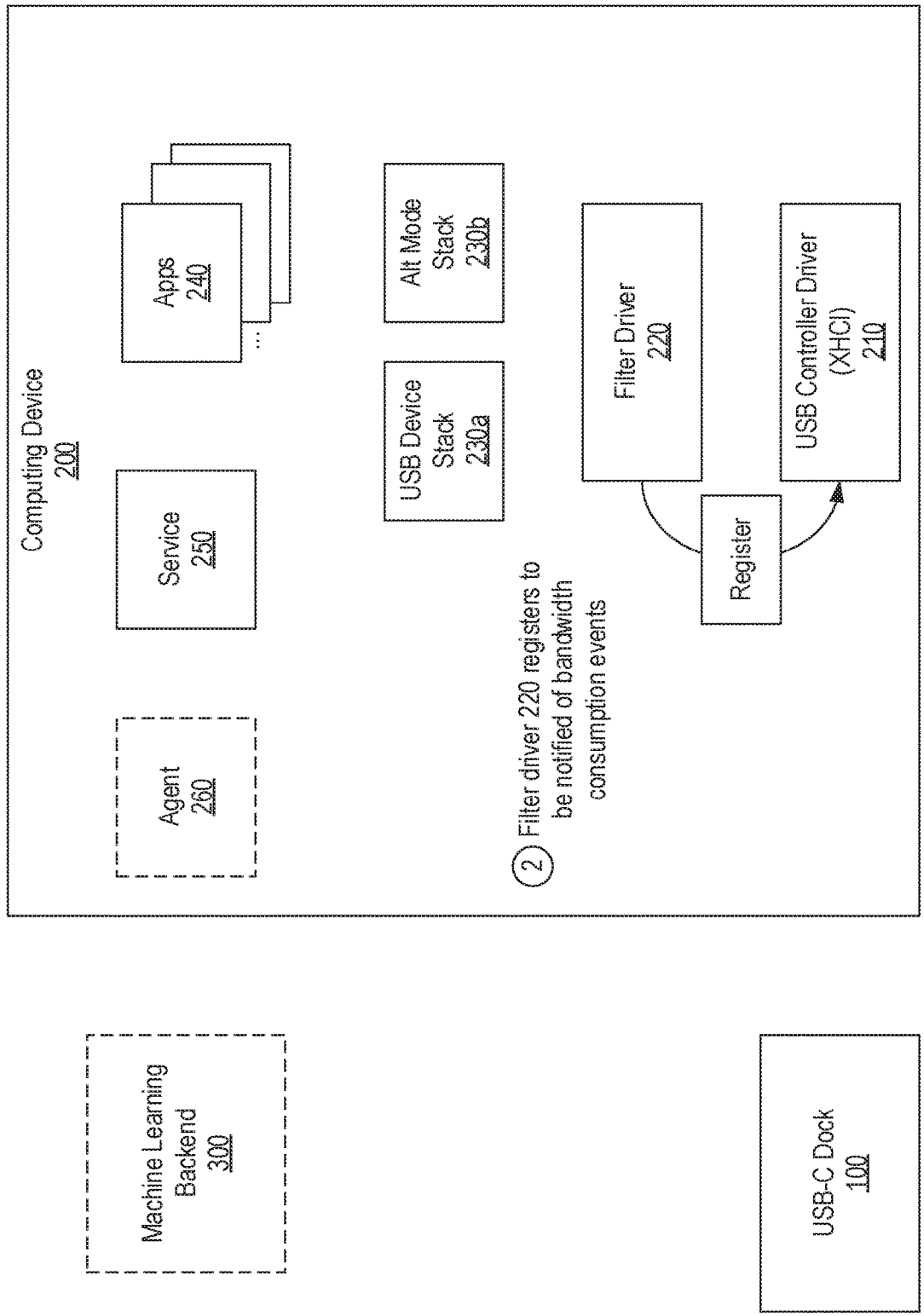

Turning to FIG. 3B, in step 2, filter driver 220 can register with USB controller driver 210 to receive notifications when the consumption of connection 101's bandwidth reaches an upper threshold or a lower threshold. As one example only, as part of its initialization, filter driver 200 could register to be notified when the bandwidth consumption increases beyond 90% or drops below 60% of the total available bandwidth. Notably, filter driver 220 can register for such notifications when it leverages USB controller driver 210's traffic prioritization techniques and when it provides traffic prioritization techniques itself.

Figure 3C:
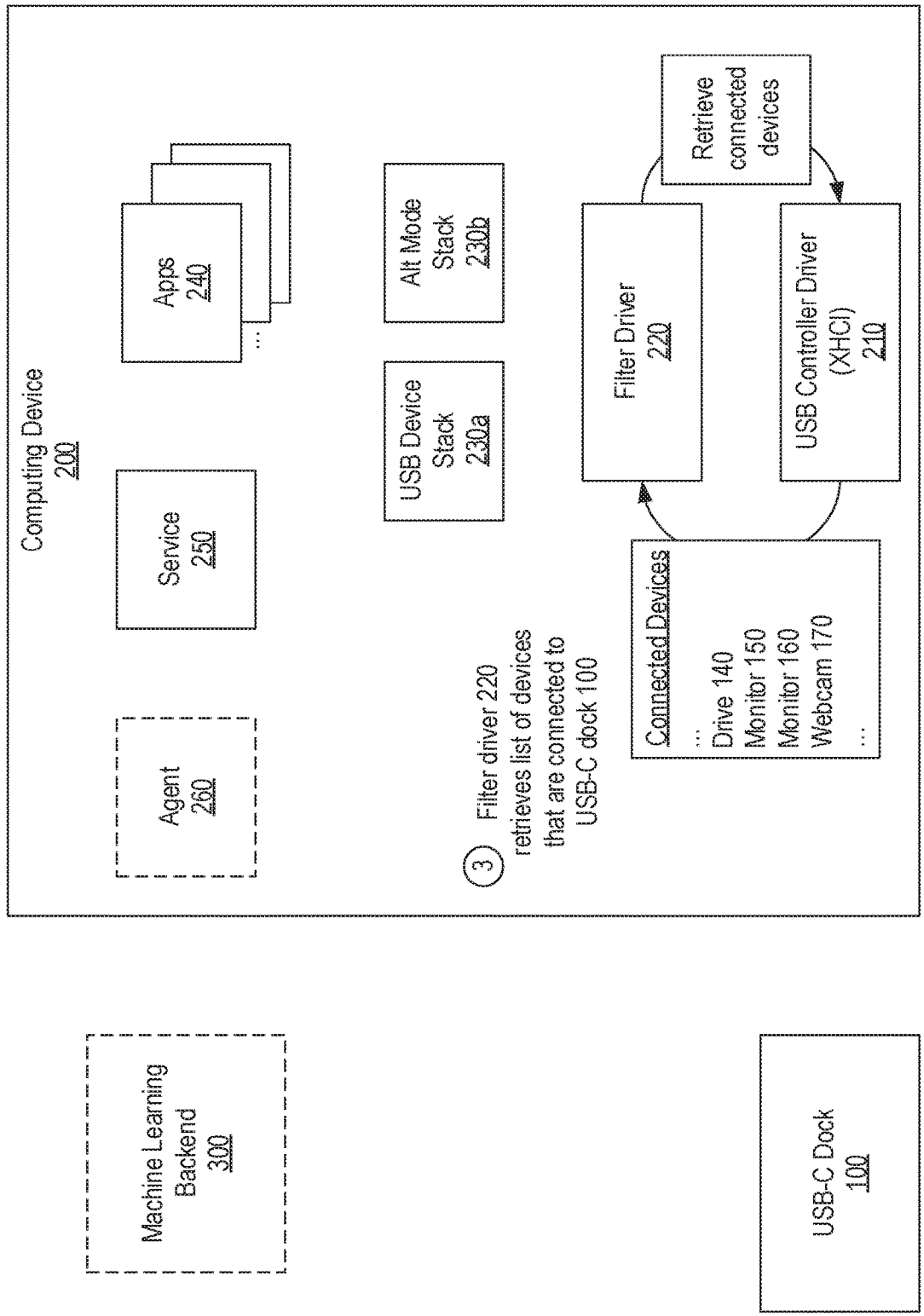
Figure 3D:
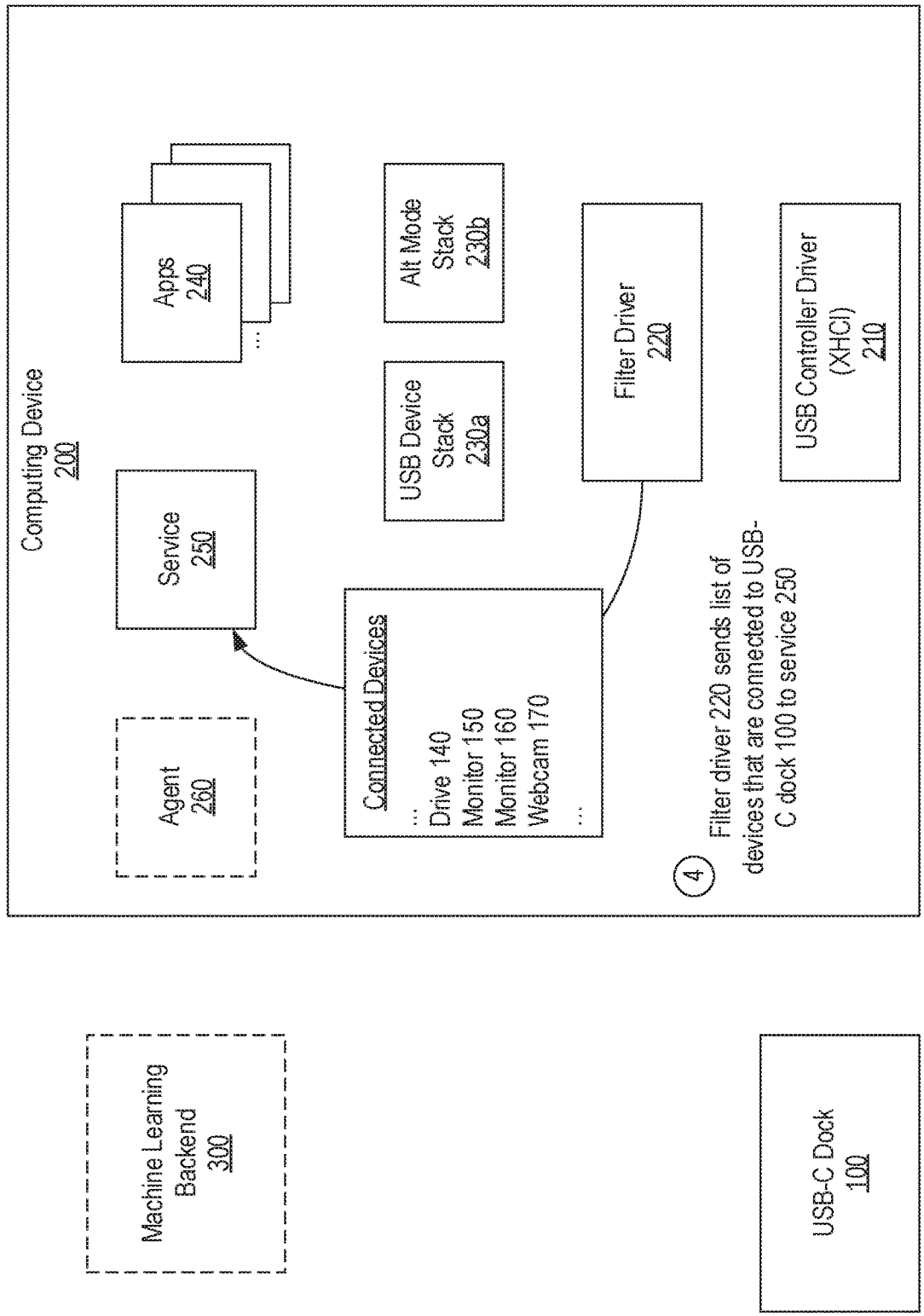

Turning to FIG. 3C, in step 3, which may also be performed as part of its initialization, filter driver 220 can retrieve a list of devices that are connected to USB-C dock 100. For purposes of this example, it will be assumed that the connected devices are the same as shown in FIG. 1. Then, in step 4 shown in FIG. 3D, filter driver 220 can send the list of connected devices to service 250. Filter driver 220 could perform steps 3 and 4 at any time to inform service 250 of which USB devices are currently connected to USB-C dock 100.

Figure 3E:
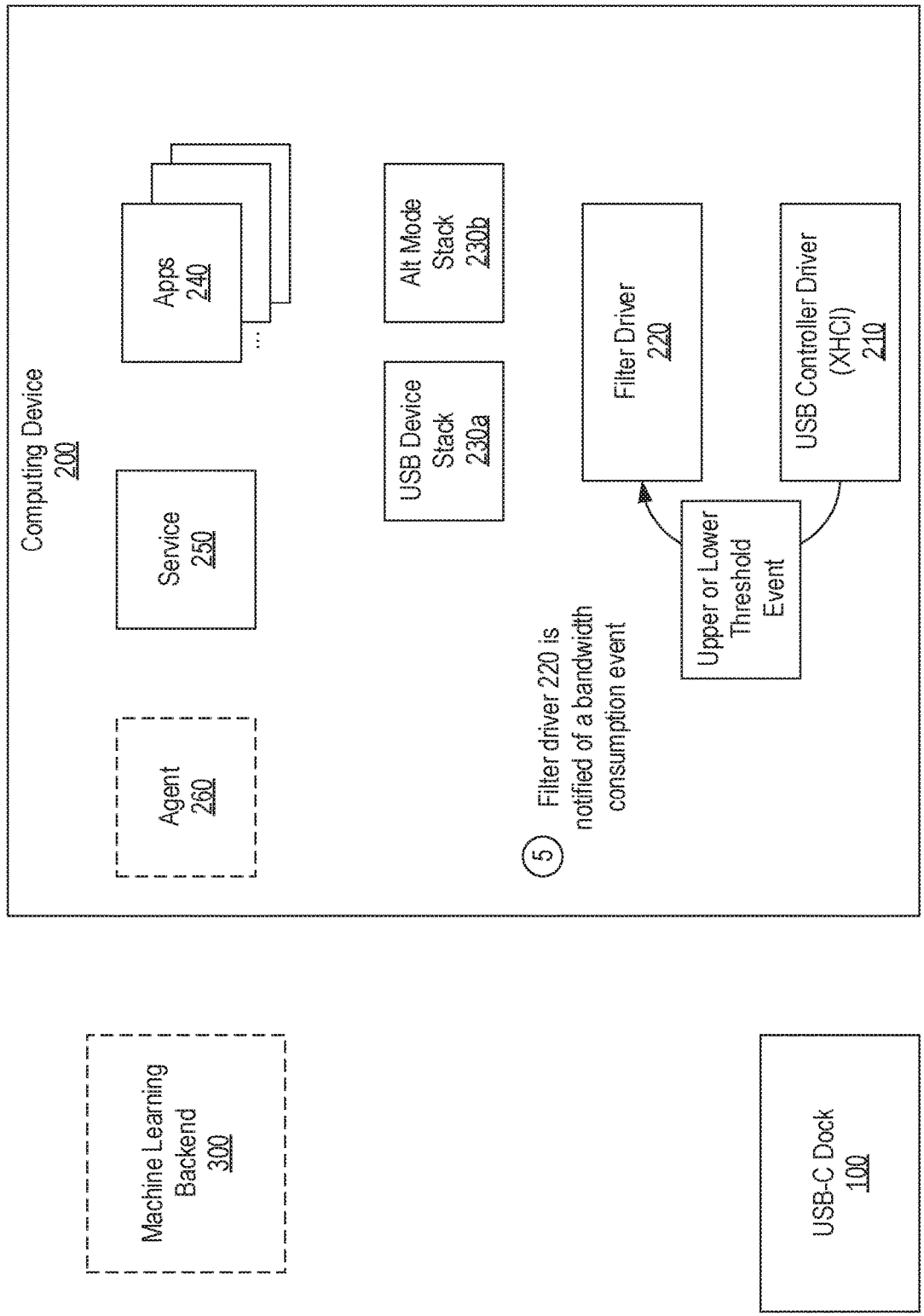
Figure 3F:
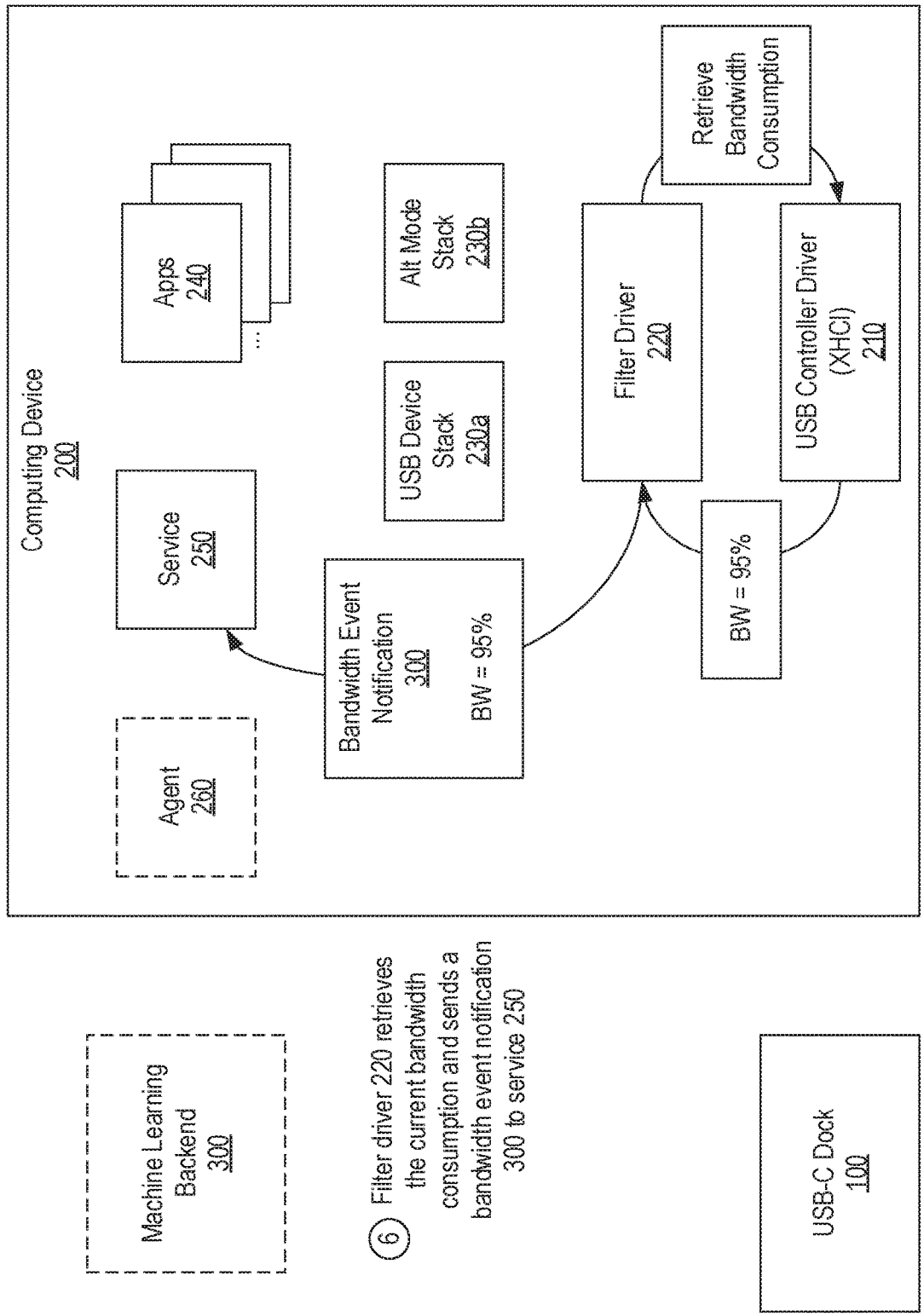

Turning to FIG. 3E, in step 5, it is assumed that filter driver 220 is notified that the current consumption of connection 101's bandwidth has crossed the upper or lower threshold. For example, an upper threshold event may be triggered when the user of computing device 200 is using applications 240 to host a video conference while performing a backup to external storage drive 140. As represented in step 6 in FIG. 3F, in response to either an upper threshold event or lower threshold event, filter driver 220 can query USB controller driver 210 for the current bandwidth consumption. In this example, it is assumed that 95% of connection 101's bandwidth is currently being consumed. Filter driver 220 can then send a bandwidth event notification 300 to service 250 which specifies the current bandwidth consumption. Accordingly, filter driver 220 can be configured to notify service 250 of the current consumption of connection 101's bandwidth whenever the consumption reaches an upper or lower threshold.

Figure 4A:
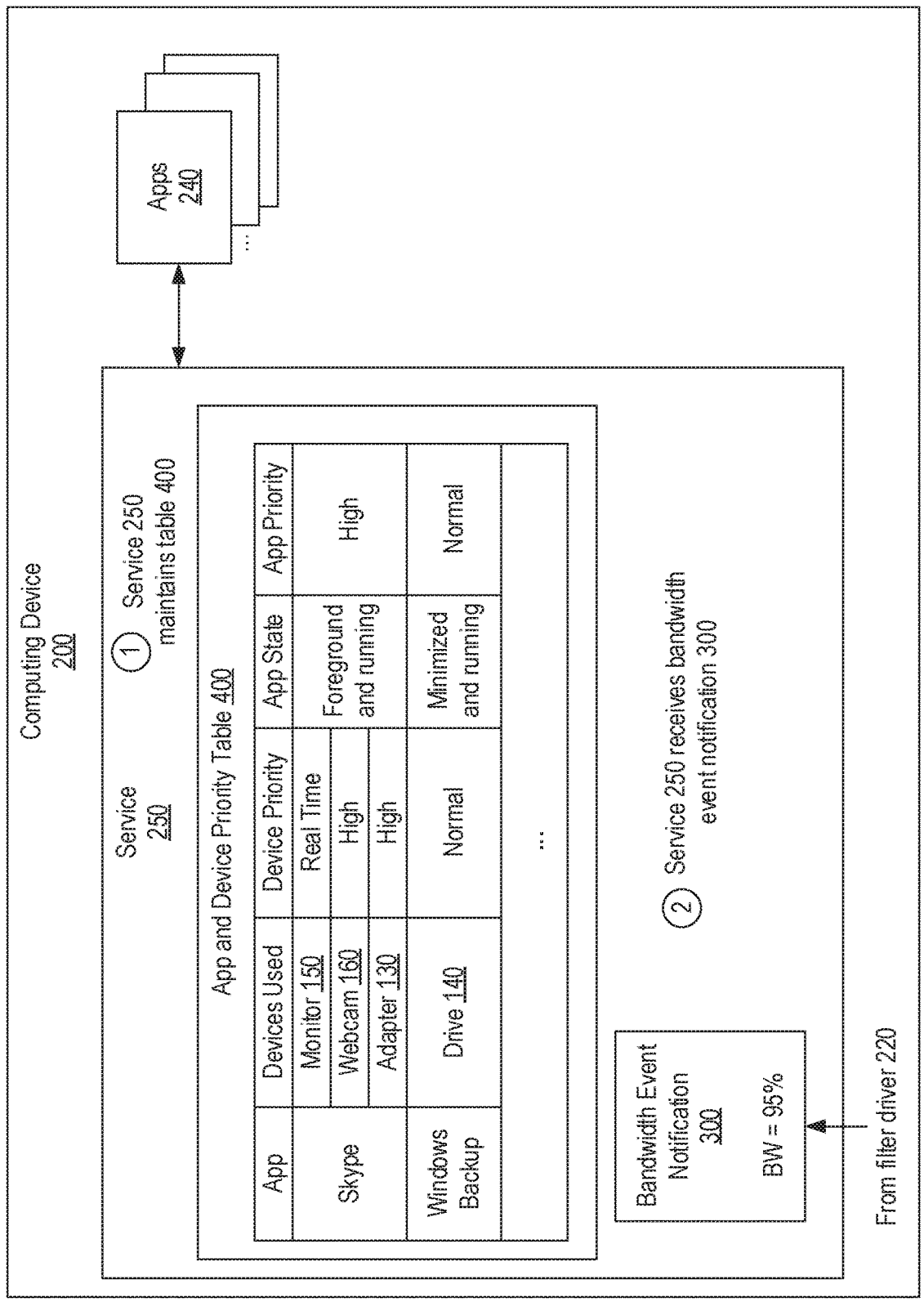
FIGS. 4A-4C provide an example of how a service may generate device priority values for the devices that are connected to the USB-C dock based on the applications that are accessing the device.
Figure 4B:
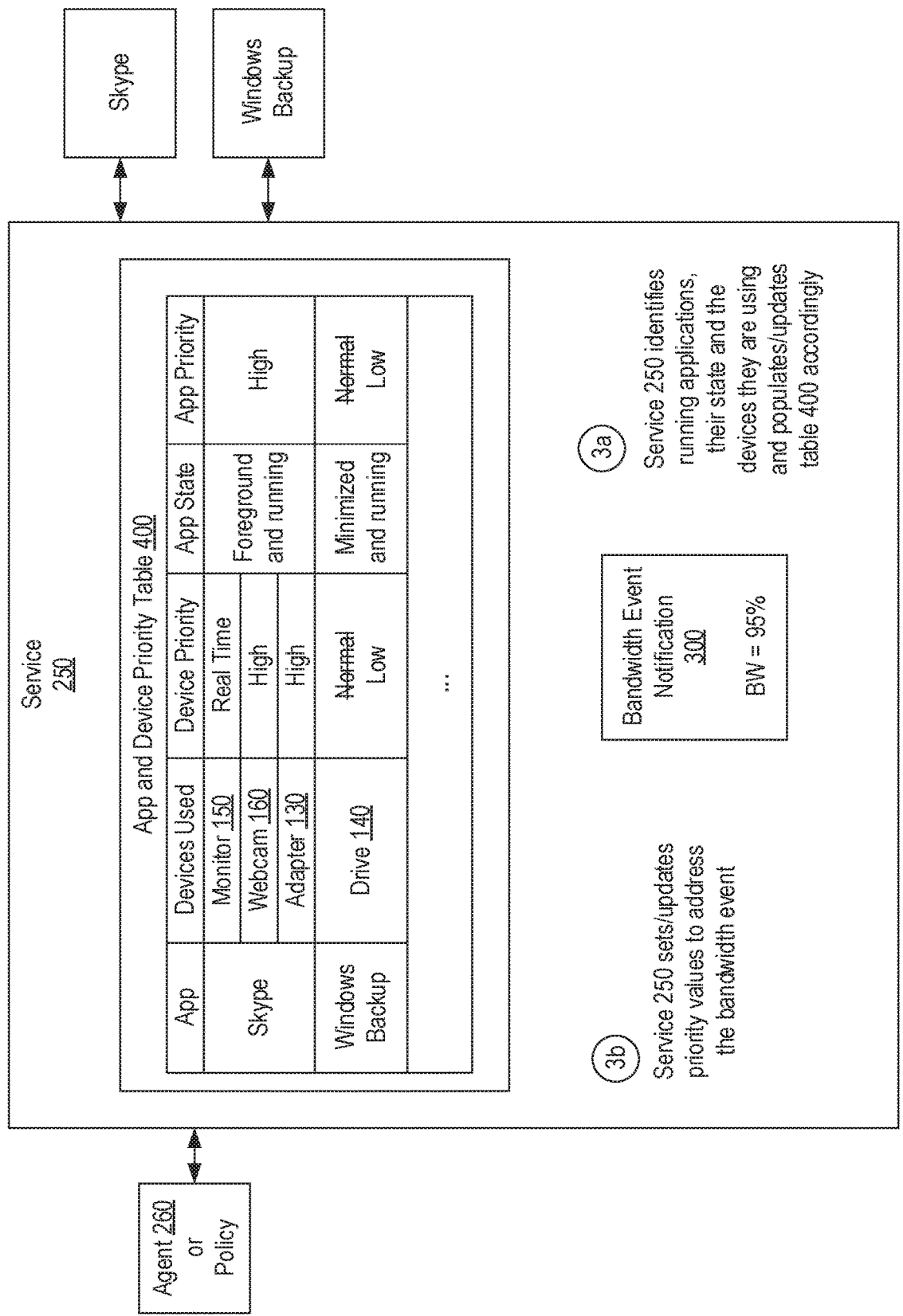
Figure 4C:
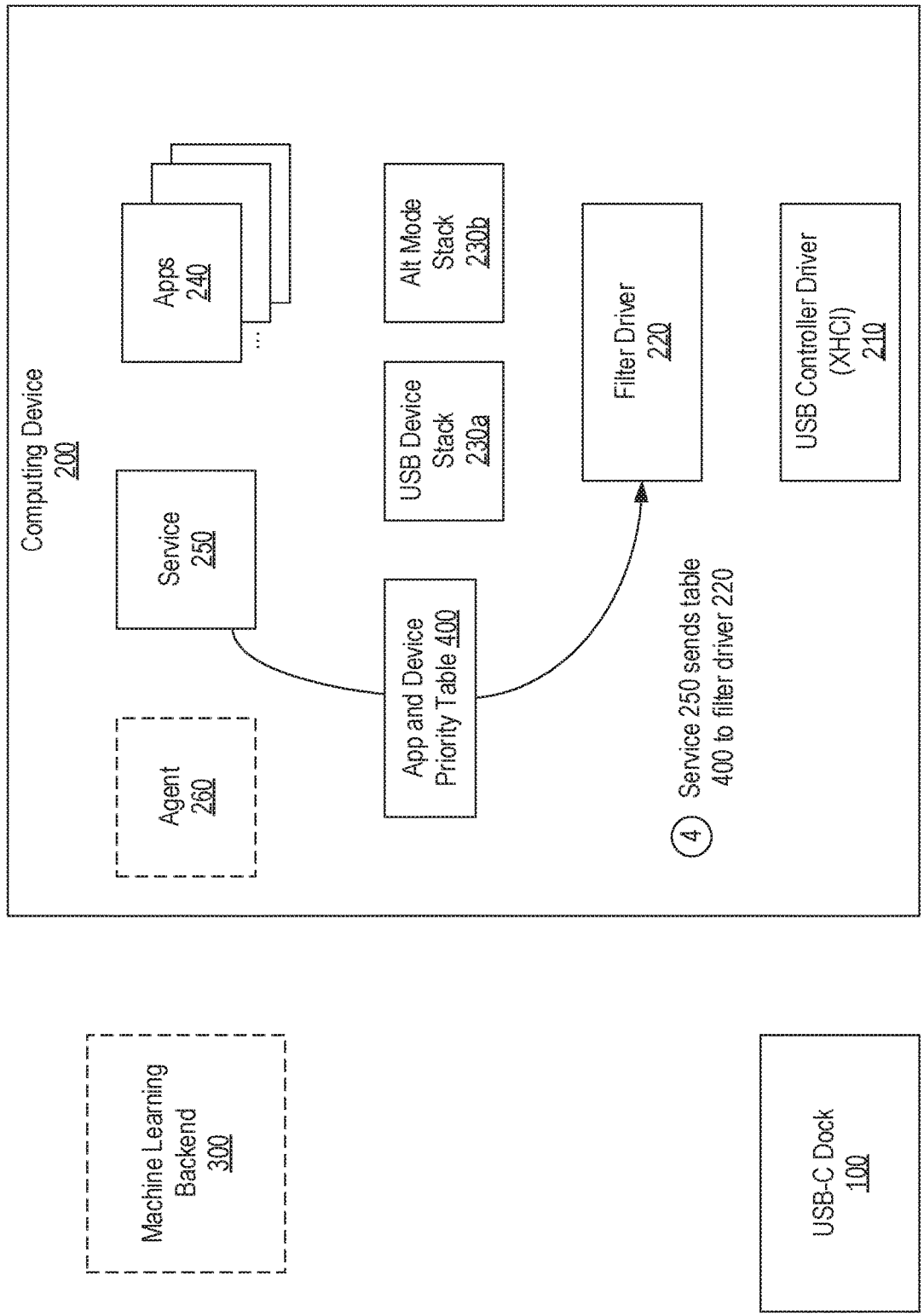

FIGS. 4A-4C represent how service 250 may respond to bandwidth event report 300. As shown as step 1 in FIG. 4A, service 250 can maintain an application and device priority table 400 (hereinafter table 400) that identifies applications on computing device 200, the devices that each application is using, a priority for each device, a state of the application and a priority of the application. Service 250 can be configured to monitor applications 240 to populate the applications, devices used (e.g., using the list of connected devices that filter driver 220 provided) and application state columns of table 400. Service 250 may do so periodically, in response to bandwidth event reports 300 or at any other suitable time. In some embodiments, service 250 may monitor all running applications on computing device 200, while in other embodiments, service 250 may monitor only specified applications.

In some embodiments, service 250 may initially employ default values for the device priority and the application priority in table 400. In some embodiments, service 250 may use a policy to set the initial or default values for the device priority and the application priority. In some embodiments, service 250 may set the initial values for the device priority and the application priority based on a detected workload or use case on computing device 200 (e.g., whether computing device 200 is being used for a video conference, for engineering, for gaming, etc.). In some embodiments, service 250 may interface with agent 260 to leverage machine learning backend 300 to determine the workload or use case. For purposes of the depicted example, the values shown in FIG. 4A can be viewed as initial or default values.

Turning to FIG. 4B, in response to receiving bandwidth event report 300, in step 3a, service 250 may interface with/monitor applications 240 to determine which applications are currently using the devices that are connected to USB-C dock 100 and can populate/update table 400 accordingly. In this example, it is assumed that the user is running Skype in the foreground on monitor 150 to host a video conference and is running Windows Backup minimized while it performs a backup to drive 140.

In addition to determining this information about the applications that are accessing the devices connected to USB-C dock 100, in step 3b, service 250 can also populate table 400 with priority values that will attempt to address the bandwidth event defined in bandwidth event report 300. For example, service 250 could employ internal logic to calculate priority values, set the priority values based on policy, access agent 260 to leverage machine learning backend 300 to predict appropriate priority values, etc.

In the depicted example, it is assumed that service 250 had previously determined that the application priority for Skype is high and that the device priority for monitor 150 is real time, while the device priority for webcam 160 and external network adapter 130 is high. On the other hand, it is assumed that service 250 had previously determined that the application priority for Windows Backup is normal and the device priority for external storage drive 140 is normal. It is further assumed that service 250 has determined in step 3b that the device priority of external storage drive 140 and the application priority of Windows backup should be set to low to attempt to reduce bandwidth consumption. It is noted that these values for the device priority and application priority are examples only and any classification of values could be used (e.g., a binary value, a range of values, etc.).

Turning to FIG. 4C, in step 4 and after adjusting the priority values in table 400 to attempt to address the bandwidth event, service 250 can send table 400 to filter driver 220. For example, service 250 could send an IOCTL or make a remote procedure call to pass the content of table 400 to filter driver 220.

Figure 5A:
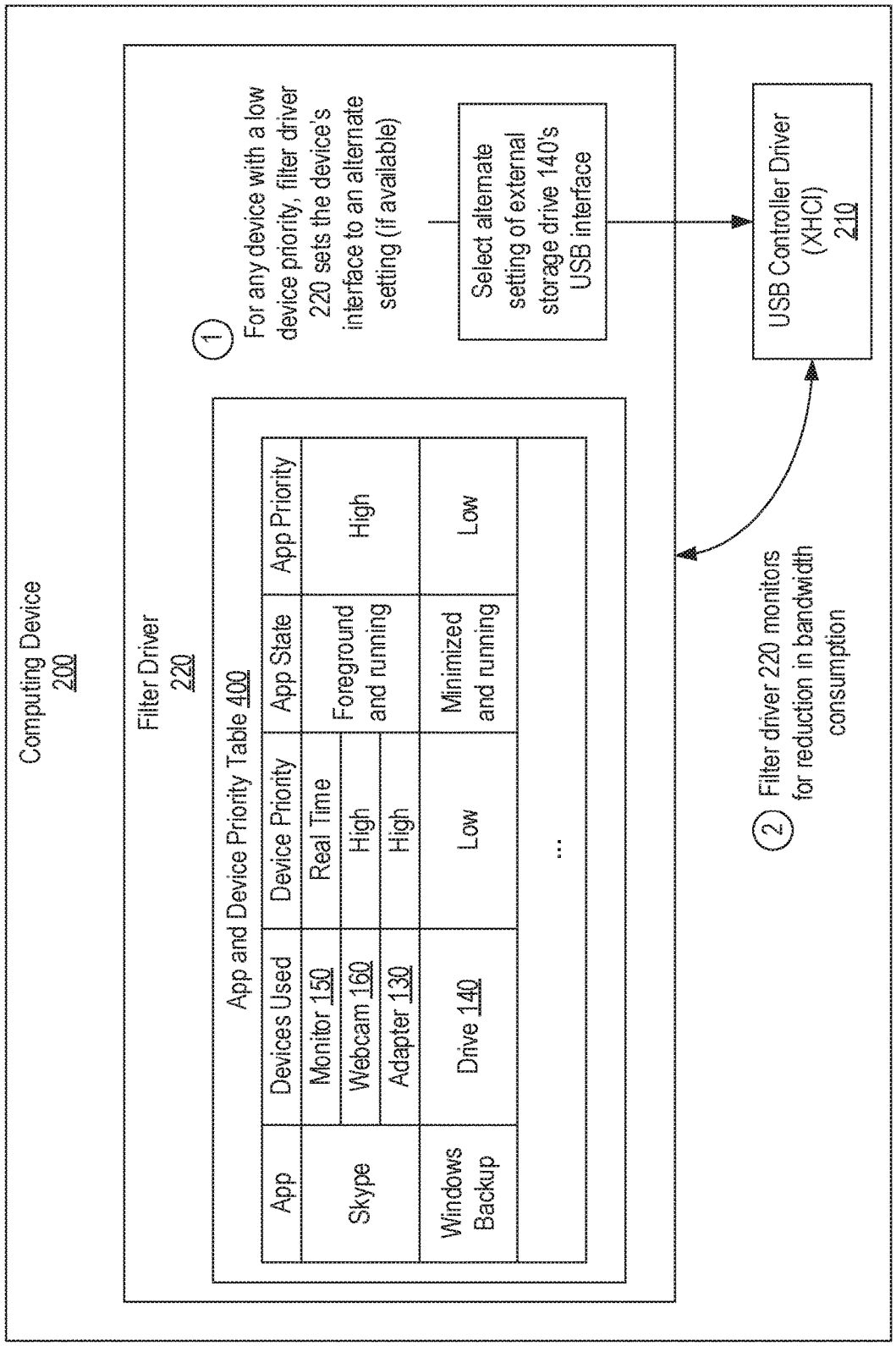
FIGS. 5A and 5B provide an example of how the filter driver may adaptively prioritize traffic based on the device priority values it receives from the service.
Figure 5B:
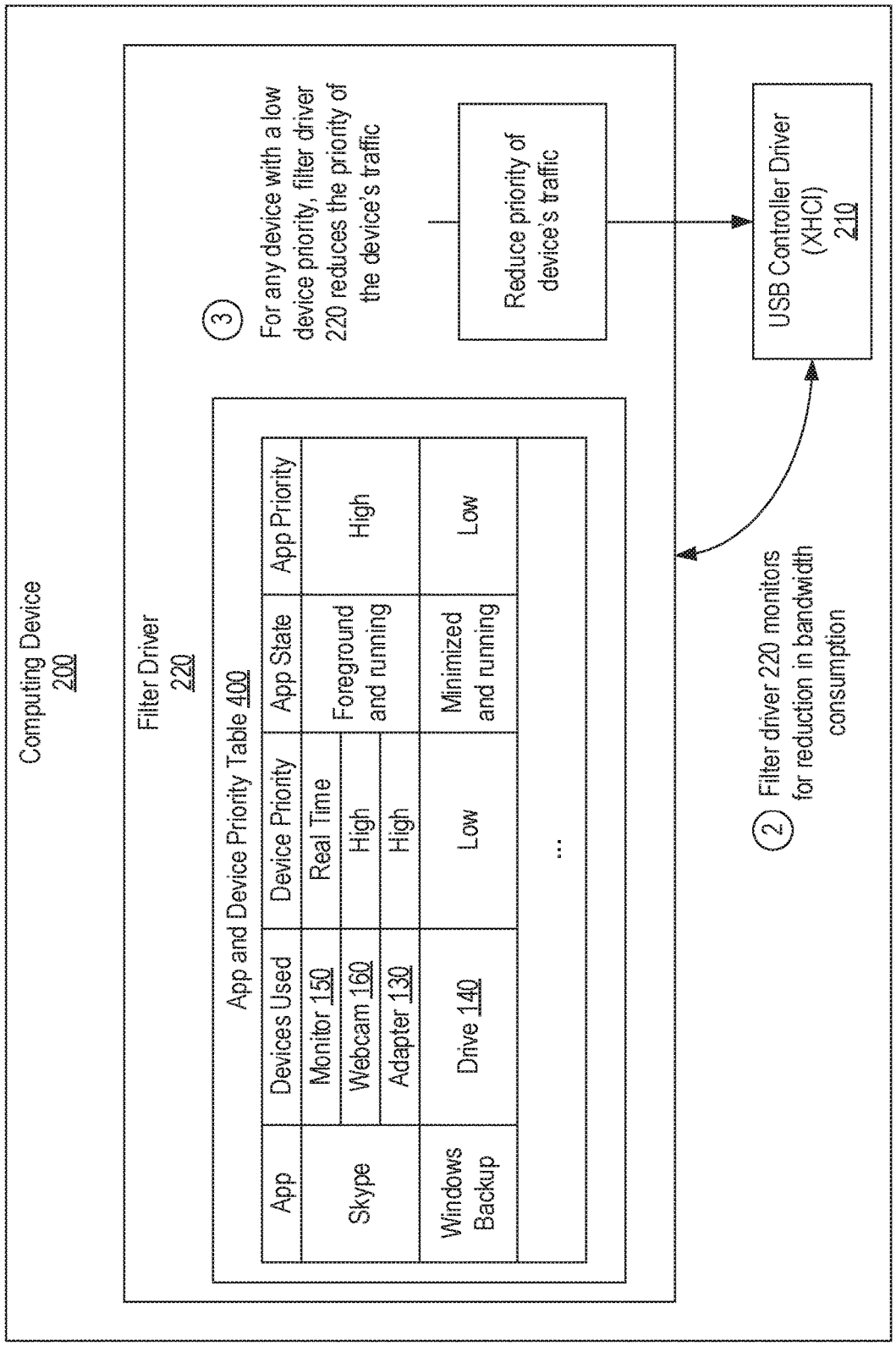

FIGS. 5A-5B represent how filter driver 220 can adaptively prioritize USB traffic using table 400. As an overview, filter driver 220 can perform multiple techniques based on the device priority and application priority values defined in table 400, which in conjunction with service 250's updating of table 400 in response to bandwidth events, can reduce bandwidth consumption when the current bandwidth consumption exceeds the upper threshold and can enable increased bandwidth consumption when the current bandwidth consumption falls below the lower threshold.

Turning to FIG. 5A, in step 1, filter driver 220 can attempt to lower the bandwidth consumption by selecting an alternate setting for an interface of any device that has a device priority of low in table 400. For example, external storage drive 140 may have an interface with an alternate setting that defines one type of endpoint that requires more bandwidth and an alternate setting that defines a second type of endpoint that requires less bandwidth. As another example, webcam 170 may have an interface with a first alternate setting in which only the camera is enabled, a second alternate setting in which only the microphone is enabled and a third alternate setting in which both the camera and the microphone are enabled. Accordingly, step 1 may entail identifying which alternate settings are available for the device, determining whether an unselected alternate setting would likely result in lowered bandwidth consumption and, if so, selecting the alternate setting.

The example shows only one device that has a device priority of low. However, there may be multiple devices with a device priority of low. In such cases, the order in which filter driver 220 performs step 1 on such devices may be based on the application priority. For example, if table 400 identified a third application as having a normal application priority but was using a device with a low device priority, filter driver 400 may select an alternate setting for external storage drive 140 before selecting an alternate setting for the device that the third application is accessing.

In conjunction with performing step 1, including while performing step 1, in step 2 which is shown in both FIGS. 5A and 5B, filter driver 220 can monitor for a reduction in bandwidth consumption. Stated another way, as filter driver 220 makes adjustments based on table 400, it can monitor the bandwidth consumption to determine if the adjustments have been effective. For example, filter driver 220 can employ appropriate APIs to periodically query USB controller driver 210 for the current bandwidth consumption (e.g., in a similar manner as in step 6 of FIG. 3F). Accordingly, filter driver 220 may stop performing step 1 once it determines that bandwidth consumption has been sufficiently reduced even if it has not yet selected an alternate setting for all devices with a low device priority.

If the selection of different alternate settings for devices with a low device priority has not sufficiently lowered bandwidth consumption (e.g., below the upper threshold), in step 3 shown in FIG. 5B, filter driver 220 can reduce the priority of such devices' traffic. The manner in which filter driver 220 reduces the priority of a device's traffic will depend on whether filter driver 220 is implementing traffic prioritization techniques or is leveraging traffic prioritization techniques that USB controller driver 210 provides (e.g., whether USB controller driver 210 complies with the USB4 standard). For example, if filter driver 220 implements traffic prioritization techniques, it may reduce the priority of a device's traffic by routing the device's traffic through a lower priority queue. In contrast, if filter driver 220 leverages USB controller driver 210's traffic prioritization techniques, filter driver 220 may reduce the priority of a device's traffic by adjusting a scheduling priority value associated with the device's traffic which in turn may cause USB controller driver 210 to route the device's traffic through a lower priority queue.

In some embodiments, filter driver 220 can ensure that changes in the priority of a device's traffic are atomic across a transaction. For example, if filter driver 220 determines that the priority of external storage drive 140's traffic should be reduced, it can ensure that any pending read or write to external storage driver 140 is completed before the change is made. This can ensure that transactions will not fail in spite of the dynamic adjustments to traffic priority.

As described above, filter driver 220 can continue to perform step 2 while performing step 3. Accordingly, if filter driver 220 determines that the bandwidth consumption has been sufficiently reduced, it can forego reducing the priority of a device's traffic that has not yet been adjusted. In some embodiments, filter driver 220 may perform step 3 in an iterative fashion. For example, there may be range of possible priority values for a device's traffic. In such cases, filter driver 220 may initially reduce the priority of a device's traffic by one level. If bandwidth consumption remains too high after reducing the priority of the traffic of all devices having a low device priority in table 400, filter driver 220 could proceed to reduce the priority of each device's traffic by another level. Filter driver 220 could continue this iterative reduction in priority until bandwidth consumption has been sufficiently reduced.

Although not depicted in the figures, a similar process can be followed when the bandwidth consumption reaches the lower threshold. For example, if another bandwidth event notification 300 indicates that the bandwidth is below the lower threshold, service 250 may update/recreate table 400 to increase a device priority and/or an application priority that it had previously reduced and/or to otherwise set a device priority or application priority to a higher value (e.g., higher than a default value). Using the same example, if Skype is closed when the video conference ends, filter driver 220 may send an appropriate bandwidth event notification 300. Service 250 may then respond by removing Skype from table 400 and setting Windows Backup's application priority back to normal and external storage drive 140's device priority back to normal. When filter driver 220 receives the updated table 400, it can in turn select an alternate setting of external storage drive 140's interface that provides higher bandwidth and increase the priority of external storage drive 140's traffic.

In addition to updating table 400 in response to bandwidth consumption notifications 300 (e.g., in response to the bandwidth consumption reaching the upper or lower threshold), service 250 may also be configured to update table 400 when a device is connected to or disconnected from USB-C dock 100 (e.g., in response to a corresponding notification from filter driver 220), in response to an application being launched or closed, in response to a change in policy, in response to input from agent 260, etc.

To summarize, the adaptive prioritization process that filter driver 220 performs can first attempt to reduce bandwidth consumption by changing device settings, and then, if changing device settings is insufficient, may then attempt to reduce bandwidth consumption by lowering the priority of a device's traffic. This adaptive prioritization process can account for the state of the applications that are using the devices and can account for a particular workload or use case.

Figure 6:
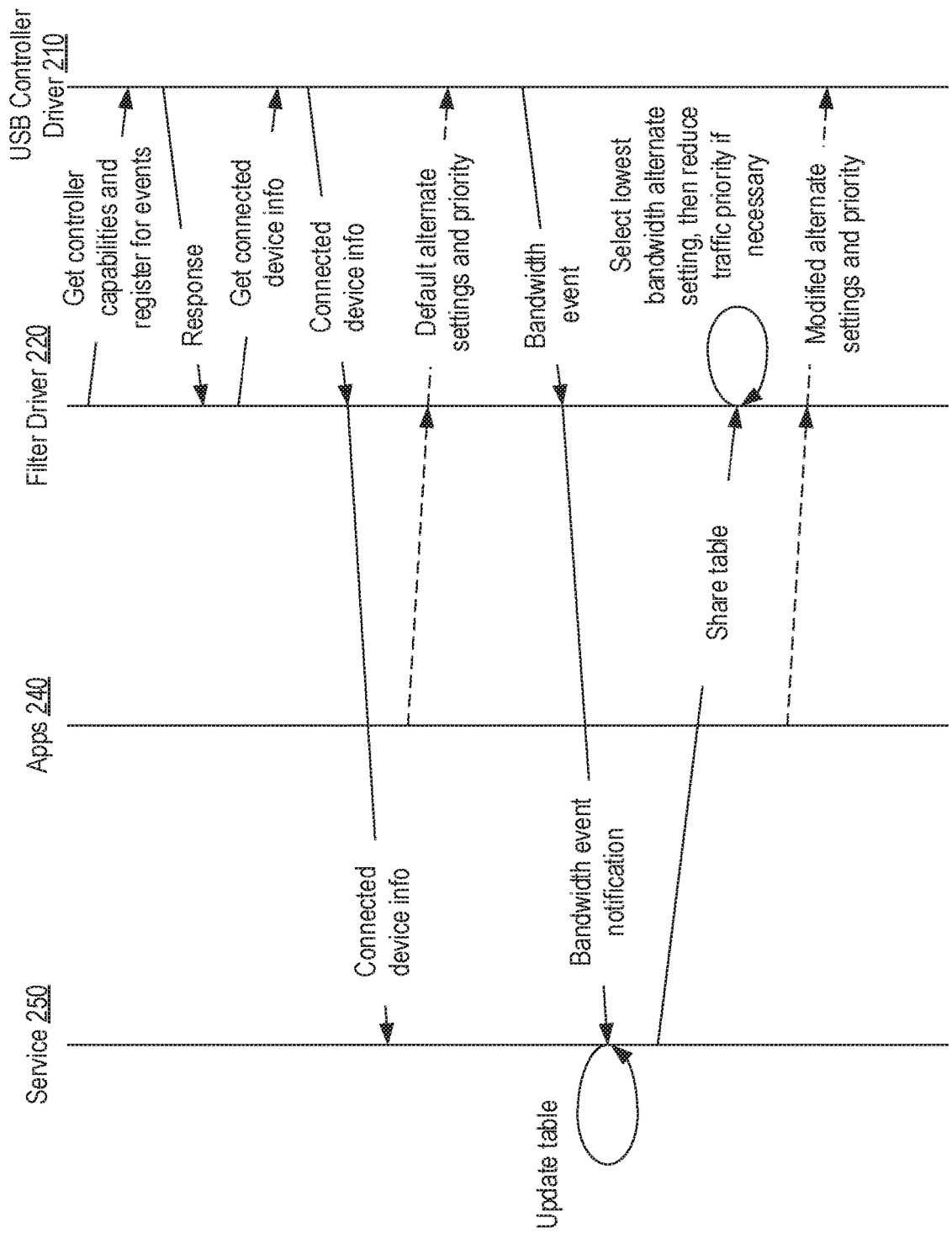
FIG. 6 is a flow diagram representing how the service and the filter driver may interoperate to adaptively prioritize traffic of USB devices that are connected to a USB-C dock.

FIG. 6 provides a flow diagram that summarizes how filter driver 220 and service 250 may adaptively prioritize USB traffic of devices that are connected to a USB-C dock. As shown, filter driver 220 can obtain the controller's capabilities and register for events. Filter driver 220 can also obtain information about the devices connected to the USB-C dock and relay the information to service 250. At this stage, applications 240 may send and receive USB traffic that will be handled in accordance with default alternate settings and priority.

Whenever a bandwidth event occurs, filter driver 220 can notify service 250. Service 250 can then update the application and device priority table and send the updated table to filter driver 220. When the bandwidth event represents excessive bandwidth consumption, filter driver 220 can employ the updated table to select the lowest bandwidth alternate settings for any device identified as having a low device priority. If selecting the lowest bandwidth alternate setting does not reduce the bandwidth consumption, filter driver 220 can reduce the device's traffic priority. At this stage, applications 240 may send and receive USB traffic that will be handled in accordance with the modified alternate settings and priority.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for adaptively prioritizing traffic of USB devices that are connected to a USB dock, the method comprising:
   registering, by a filter driver that is layered above a USB controller driver on a computing device, with the USB controller driver to be notified when bandwidth consumption of a connection between the computing device and the USB dock has exceeded a threshold;
   receiving, by the filter driver and from the USB controller driver, a notification that the bandwidth consumption of the connection between the computing device and the USB dock has exceeded the threshold when a plurality of USB devices are connected to the USB dock such that the computing device uses the connection to communicate with each of the plurality of USB devices; and
   in response to the notification, selecting a different alternate mode for at least one USB device of the plurality of USB devices that are connected to the USB dock, wherein selecting the different alternate mode comprises changing from a first alternate setting for an interface of the at least one USB device to a second alternate setting for the interface, the first alternate setting defining a first type of endpoint that requires more bandwidth and the second alternate setting defining a second type of endpoint that requires less bandwidth, wherein the filter driver selects the different alternate mode for the at least one USB device of the plurality of USB devices based on a device priority for each of the plurality of USB devices.

2. The method of claim 1, further comprising:
   sending, by the filter driver and to a service, an indication that the bandwidth consumption of the connection between the computing device and the USB dock has exceeded the threshold.

3. The method of claim 2, further comprising:
   in response to receiving the indication, setting, by the service, the device priority for each of the plurality of USB devices.

4. The method of claim 3, wherein the service sets the device priority for each of the plurality of USB devices based on applications that are accessing the plurality of USB devices.

5. The method of claim 3, further comprising:
   sending, by the service and to the filter driver, the device priority for each of the plurality of USB devices to thereby enable the filter driver to select the different alternate mode for the at least one USB device of the plurality of USB devices based on the device priority for each of the plurality of USB devices.

6. The method of claim 1, wherein selecting the different alternate mode for the at least one USB device comprises selecting the different alternate mode for each USB device that has the device priority set to a low value.

7. The method of claim 1, further comprising:
   reducing a priority of traffic for the at least one USB device.

8. The method of claim 1, wherein the USB dock is a USB-C dock.

9. One or more computer storage media storing computer executable instructions which when executed on a computing device implement a filter driver and a service;
   wherein the filter driver is configured to:
      register with a USB controller driver to be notified when bandwidth consumption of a connection between the computing device and the USB dock has reached one or more thresholds when USB devices are connected to the USB dock such that the computing device uses the connection to communicate with each of the USB devices; and
      notify the service upon receiving a notification that the bandwidth consumption of the connection between the computing device and the USB dock has reached the one or more thresholds;
   wherein the service is configured to:
      monitor applications that are accessing the USB devices that are connected to the USB dock;
      set a device priority for each of the USB devices based on the applications; and
      provide the device priority for each of the USB devices to the filter driver;
   wherein the filter driver is further configured to:
      adaptively prioritize traffic of at least one of the USB devices based on the device priority for each of the USB devices by selecting a different alternate mode for the at least one of the USB devices, wherein selecting the different alternate mode comprises changing from a first alternate setting for an interface of the at least one USB device to a second alternate setting for the interface, the first alternate setting defining a first type of endpoint that requires more bandwidth and the second alternate setting defining a second type of endpoint that requires less bandwidth.

10. The computer storage media of claim 9, wherein the filter driver is configured to adaptively prioritize traffic of at least one of the USB devices based on the device priority for each of the USB devices by also changing a priority of traffic of the at least one of the USB device.

11. The computer storage media of claim 10, wherein the at least one of the USB devices comprises at least one of the USB devices that has the device priority set to a low value.

12. A computing device comprising:
one or more processors; and
computer storage media storing computer executable instructions which when executed implement a method for adaptively prioritizing traffic of USB devices that are connected to a USB-C dock, the method comprising:
- detecting, by a filter driver, that bandwidth consumption of a connection between the computing device and the USB-C dock has exceeded a threshold when USB devices are connected to the USB dock such that the computing device uses the connection to communicate with each of the USB devices;
- sending, by the filter driver and to a service, a notification that the bandwidth consumption of the connection between the computing device and the USB-C dock has exceeded the threshold;
- in response to the notification and in conjunction with monitoring applications that are accessing the USB devices that are connected to the USB-C dock, identifying, by the service, a device priority for each of the USB devices; and
- in response to receiving the device priority for each of the USB devices from the service, changing, by the filter driver, an alternate mode of at least one of the USB devices, wherein selecting the different alternate mode comprises changing from a first alternate setting for an interface of the at least one USB device to a second alternate setting for the interface, the first alternate setting defining a first type of endpoint that requires more bandwidth and the second alternate setting defining a second type of endpoint that requires less bandwidth.

13. The computing device of claim 12, wherein changing the alternate mode of the at least one of the USB devices comprises changing the alternate mode of at least one of the USB devices that has the device priority set to a low value.

14. The computing device of claim 12, further comprising:
- determining, by the filter driver, that changing the alternate mode of the at least one of the USB devices has not lowered the bandwidth consumption below the threshold; and
- changing a priority of traffic of the at least one of the USB devices.

* * * * *